E. CHURCH.
FEEDERS FOR THRASHING-MACHINES.
No. 173,586. Patented Feb. 15, 1876.
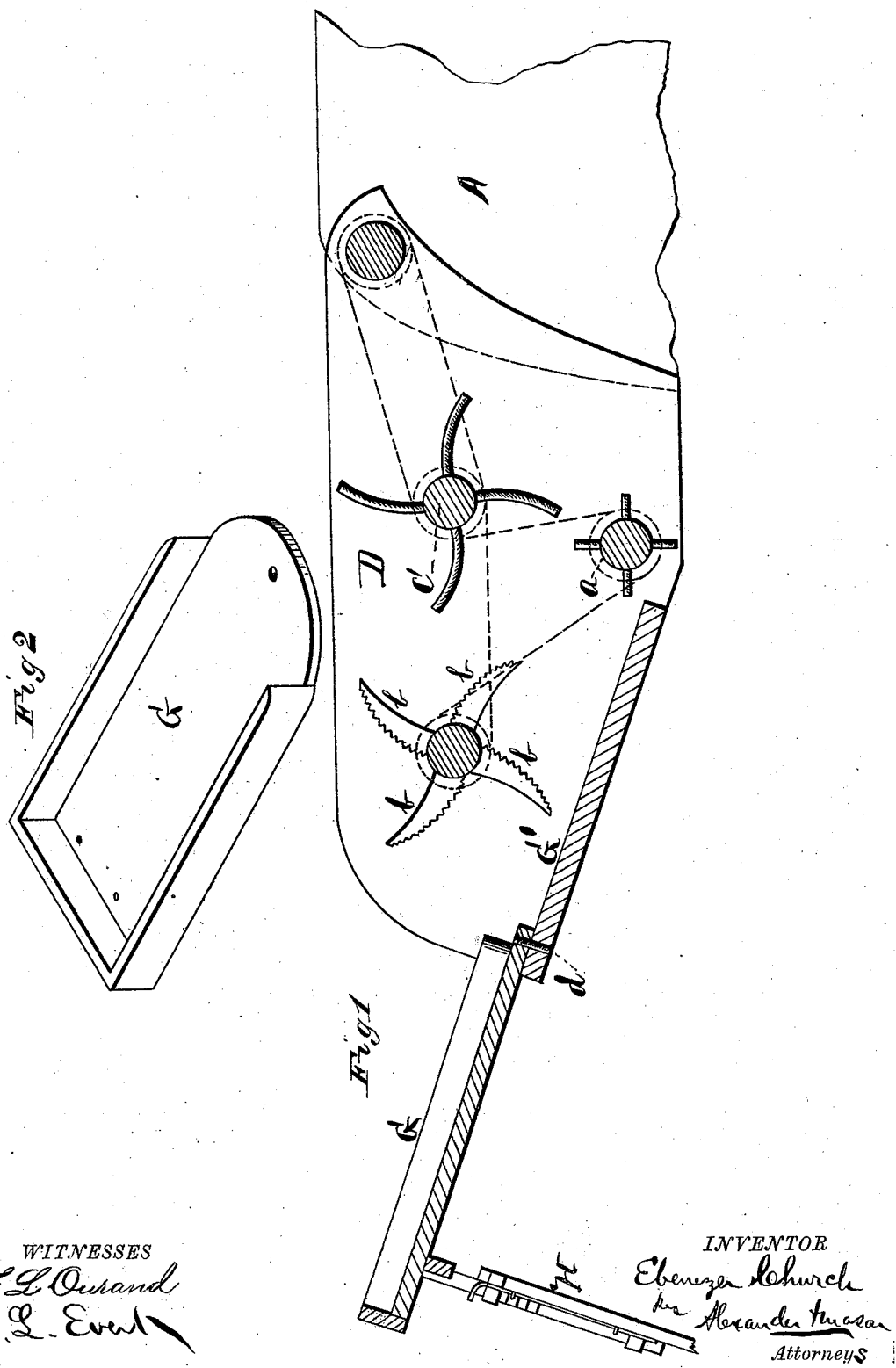

UNITED STATES PATENT OFFICE.

EBENEZER CHURCH, OF PATOKA, INDIANA, ASSIGNOR OF ONE-HALF HIS RIGHT TO ALBERT R. WOODS, OF SAME PLACE.

IMPROVEMENT IN FEEDERS FOR THRASHING-MACHINES.

Specification forming part of Letters Patent No. 173,586, dated February 15, 1876; application filed February 24, 1875.

*To all whom it may concern:*

Be it known that I, EBENEZER CHURCH, of Patoka, in the county of Gibson and in the State of Indiana, have invented certain new and useful Improvements in Thrashing-Machines; and do hereby declare that the following is a full, clear, and exact description thereof, reference being had to the accompanying drawing, and to the letters of reference marked thereon, making a part of this specification.

My invention relates to band-cutting attachments for thrashing-machines; and it consists in a vertically-adjustable inclined feed-table, made in sections and pivoted together to allow lateral adjustment, in combination with the frame hinged to the thrashing-machine, and having cutting and distributing knives, all as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my invention. Fig. 2 is a perspective view of the laterally-adjustable section of the feeding-table.

A represents a portion of the frame of a thrashing-machine. D is a frame, carrying the revolving band-cutting knives $b\,b$ and the revolving distributing-teeth C and $a$, as shown. The feed-table, over which the grain is fed to the band-cutting attachment, is made in sections G and G′, the section G′ being permanently attached to the frame D, and the section G extends beyond said frame and is pivoted to the section G′ by a bolt or pin, $d$. The lower or inner end of the section G is rounded, as shown in Fig. 2. The inner end of the frame D is hinged to the mouth of the thrashing-machine frame A, so that the outer end can be adjusted up and down, as desired. The outer end of the feeding-table is supported upon a lifting-jack, H, of any suitable construction, by means of which the feeding-table and band-cutting attachment are adjusted up and down and held at any height desired.

The inclined feeding-table being made in sections, and the outer section pivoted as described, this section can be adjusted laterally, so as to permit the operator to feed from either side or straight from the front, as may be most convenient.

Having thus fully described my invention, what I claim as new, and desire to secure by Letters Patent, is—

The vertically-adjustable inclined feed-table, made in sections, and pivoted together to allow lateral adjustment, in combination with the hinged frame D, having cutting and distributing knives, all substantially as and for the purposes herein set forth.

In testimony that I claim the foregoing I have hereunto set my hand this 30th day of January, 1875.

EBENEZER CHURCH.

Witnesses:
WHIT. C. LAMB,
WILLIAM JERAULD.